United States Patent
Hirsch

(10) Patent No.: US 8,364,641 B2
(45) Date of Patent: Jan. 29, 2013

(54) METHOD AND SYSTEM FOR DEDUPLICATING DATA

(75) Inventor: Michael Hirsch, Mazkeret Batya (IL)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 12/968,680

(22) Filed: Dec. 15, 2010

(65) Prior Publication Data

US 2012/0158660 A1 Jun. 21, 2012

(51) Int. Cl.
*G06F 7/00* (2006.01)
*G06F 17/00* (2006.01)
*G06F 12/00* (2006.01)
*G06F 13/00* (2006.01)
*G06F 13/28* (2006.01)

(52) U.S. Cl. ........................................ 707/640; 711/117

(58) Field of Classification Search ........................ None
See application file for complete search history.

(56) References Cited

U.S. PATENT DOCUMENTS

| | | | |
|---|---|---|---|
| 4,638,424 A * | 1/1987 | Beglin et al. | 711/117 |
| 6,975,647 B2 * | 12/2005 | Neale et al. | 370/466 |
| 7,103,608 B1 * | 9/2006 | Ozbutun et al. | 707/604 |
| 7,747,584 B1 | 6/2010 | Jernigan, IV | |
| 8,099,428 B2 * | 1/2012 | Kottomtharayil et al. | 707/770 |
| 2007/0260834 A1 * | 11/2007 | Kavuri et al. | 711/162 |
| 2008/0005201 A1 | 1/2008 | Ting et al. | |
| 2008/0294696 A1 * | 11/2008 | Frandzel | 707/200 |
| 2009/0049260 A1 | 2/2009 | Upadhyayula | |
| 2009/0182789 A1 | 7/2009 | Sandorfi et al. | |
| 2010/0077161 A1 | 3/2010 | Stoakes et al. | |
| 2010/0082547 A1 | 4/2010 | Mace et al. | |
| 2010/0199065 A1 | 8/2010 | Kaneda | |
| 2010/0241726 A1 * | 9/2010 | Wu | 709/217 |

OTHER PUBLICATIONS

APPNOTE.TXT—.ZIP File Format Specification, Sep. 28, 2007 [Accessed 15 May 12], PKWARE Inc., Version 6.3.2, http://www.pkware.com/documents/casestudies/APPNOTE.TXT.*
Harrison, CDIA Training and Test Preparation Guide 2000, Specialized Solutions Inc, pp. 68-69.*
Tony Asaro et al., "Data De-duplication and Disk-to-Disk Backup Systems," Enterprise Strategy Group, Jul. 2007, 15 pages.
Deepavali Bhagwat et al., "Extreme Binning: Scalable, Parallel Deduplication for Chunk-based File Backup," IEEE, 2009, 9 pages.
Heidi Biggar, "Experiencing Data De-Duplication: Improving Efficiency and Reducing Capacity Requirements," Enterprise Strategy Group, Feb. 2007, 11 pages.
Cornel Constantinescu et al., "Block Size Optimization in Deduplication Systems," 2009 Data Compression Conference, IEEE, 1068-0314/09, p. 442.
Cornel Constantinescu, "Compression for Data Archiving and Backup Revisited," Proc. of SPIE vol. 7444 74440C-1, 2009, 12 pages.
Steven Scully et al., "Improving Storage Efficiencies with Data Deduplication and Compression," IDC, May 2010, 7 pages.

* cited by examiner

*Primary Examiner* — Jason Liao
(74) *Attorney, Agent, or Firm* — Griffiths & Seaton PLLC

(57) ABSTRACT

Methods, computer systems, and computer program products for deduplicating data in a computing environment are provided. A sequence of data is received. The sequence of data is formatted for back-up such that an order of the sequence of data is different than the order of an input sequence of the data. The sequence of data is stored in the same order as the input sequence of the data.

10 Claims, 4 Drawing Sheets

METHOD AND SYSTEM FOR DEDUPLICATING DATA

BACKGROUND OF THE INVENTION

1. Field of the Invention

The present invention relates in general to computers, and more particularly to methods, computer systems, and computer program products for deduplicating data.

2. Description of the Related Art

Over time, data deduplication engines are presented with multiple similar copies of the same data. Unfortunately, the method of presentation is usually done using a back-up tool or application. Almost always, the back-up application adds its own metadata (block and file headers, for example) in an overlay over the underlying user data that is being backed up. At best, this overlay causes minor interference to the algorithms of the deduplication engine, but sometimes this overlay is so detrimental that deduplication efficiency is marginal.

One commonly employed method is to preprocess the back-up data in order to remove the overlay or enough of the overlay to minimize the interference. Some common back-up tools reorder the user data as it is sent to the back-up media. This reordering of the data breaks the matching of the user data that underlies the application overlay, causing poor deduplication.

SUMMARY OF THE DESCRIBED EMBODIMENTS

In one embodiment, a method for deduplicating data in a computing environment is provided. A sequence of input data is received. The sequence of input data is formatted for back-up such that an order of the sequence of back-up data is different than the order of a sequence of the input data. The sequence of back-up data is reordered to substantially the same order as the sequence of the input data prior to deduplication.

In another embodiment, a computer system is provided. The computer system includes at least one computer-readable medium and at least one processor device in operable communication with the at least one computer-readable medium. The at least one processor is adapted to receive a sequence of data, wherein the sequence of data is formatted for back-up such that an order of the sequence of data is different than the order of a input sequence of the data and store the sequence of data in the same order as the input sequence of the data.

In a further embodiment, a computer program product for deduplicating data in a computing environment is provided. The computing environment includes at least one computer-readable medium having computer-readable program code portions stored thereon. The computer-readable program code portions include a first executable portion for receiving a sequence of data, wherein the sequence of data is formatted for back-up such that an order of the sequence of the data is different than the order of an input sequence of the data and a second executable portion for storing the sequence of data in the same order as the input sequence of the input data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and computer program products for deduplicating data in a computing (or computer) environment. A sequence of input data is received. The sequence of input data is formatted for back-up such that an order of the sequence of back-up data is different than the order of a sequence of the input data. The sequence of back-up data is reordered to substantially the same order as the sequence of the input data prior to deduplication. More particularly, the natural, or original, order of the input data sequence may have a first block positioned before a second block. However, the back-up formatting causes the second block to appear before the first block. In accordance with one aspect of the present invention, the back-up data sequence is reordered with the first block repositioned in the sequence to appear before the second block, as is found in the original formatting of the data sequence, prior to deduplication.

That is, in addition to the preprocessing step to remove the back-up application overlay, as in the case with some deduplicating systems, an additional step is inserted to return the user data to its original order before the user data is presented to the deduplication engine. The changes made are recorded and are reversed when the data is restored.

In one embodiment, the system examines back-up data as it is presented to it. If it identifies that the back-up data was prepared by, for example, the Hierarchical Storage Management (HSM) technique, the track and record headers that HSM has inserted into the back-up data are examined. One of these headers may contain an indication that the user data has indeed been reordered. In one embodiment, the system leaves space (or void) in the back-up stream for the reordered data to be replaced. Later, when the reordered data is encountered in the back-up data, it is removed from its current stream and copied back to where it should have appeared.

Figure 1:
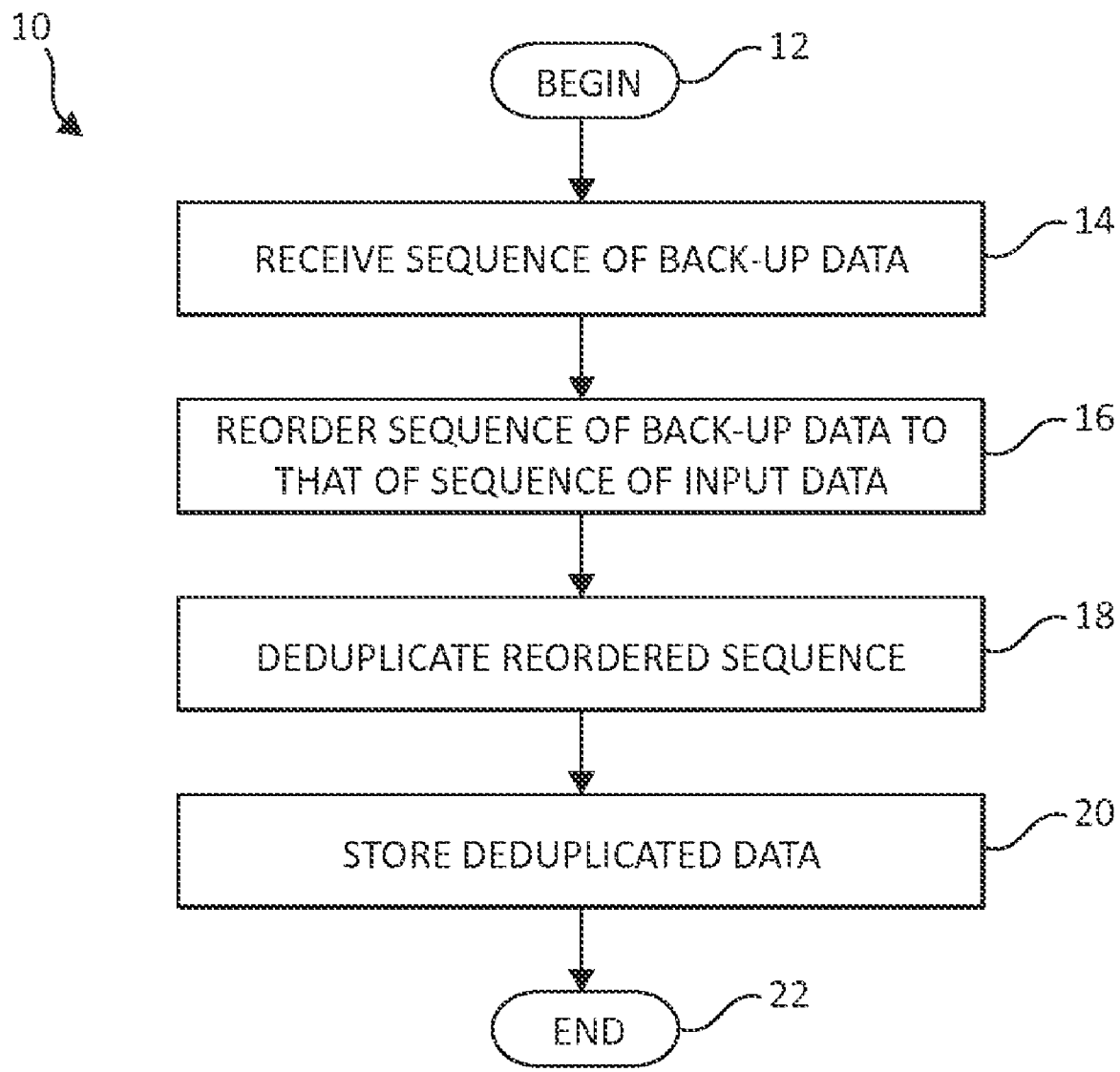
FIG. 1 is a flow chart of a method for deduplicating data in a computer environment according to an embodiment of the present invention.

FIG. 1 illustrates a method 10 for deduplicating data in a computing environment, according to one embodiment of the present invention. At step 12, the method 10 begins with, for example, a sequence of input data (or a plurality of data segments or blocks) that has been formatted for back-up and sent to the computing system described herein. That is, in one embodiment, the data sequence is formatted by another computer system (i.e., a client). In one embodiment, the sequence of back-up data is formatted using the HSM technique, and as a result, the order of the sequence has been changed compared to that of the original, input data sequence.

At step 14, the data sequence is received from the other computer system. At step 16, the data sequence is reordered to the order as it was on the original data sequence (i.e., in the original order), and at step 18, the re-ordered sequence is deduplicated. Next, the deduplicated data is stored at step 20, and at step 22, the method 10 ends after the data sequence has been stored.

Figure 2:
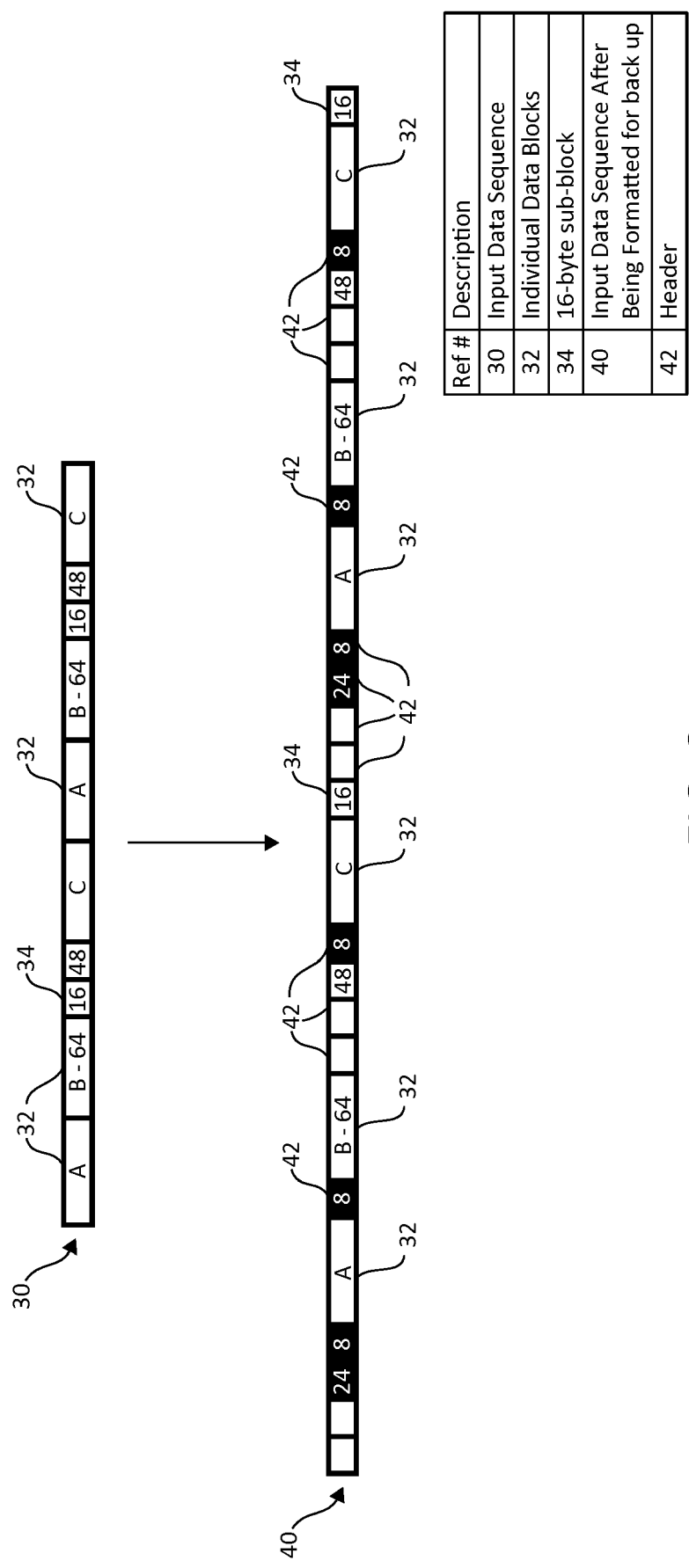
FIG. 2 is a block diagram illustrating changes made to a sequence of data when it is formatted for back-up.

FIG. 2 illustrates, in block diagram form, how an input data sequence 30 is formatted for back-up in such a way as to change the order of the individual blocks or segments 32, such as by HSM formatting. As shown, the input data sequence 30 includes multiple data blocks 32, each of which is labeled (i.e., A, B-64, 16, 48, C). The B-64, 16, and 48 data blocks 32 may be understood to represent a single 16 kilobyte (16 KB) data block 32 separated into a first sub-block of 16 KB less 64 bytes (i.e., B-64), a 16-byte sub-block (i.e., 16), and a 48-byte sub-block (i.e., 48). That is, the B-64 sub-block may be the "B" block, with the last 64 bytes excluded. In order to facilitate understanding FIG. 2, the 16-byte sub-block of B is indicated with reference numeral 34.

Still referring to FIG. 2, data sequence 40 represents the input data sequence 30 after it has been formatted for back-up using the HSM technique. As shown, the HSM formatting has inserted various headers 42 (e.g., block headers, track headers, and record headers) into the sequence 20. Of particular interest in FIG. 2, is that the HSM formatting has changed the order of the data, such that the 16-byte sub-block of B 34 has been moved so that is appears (or is positioned) after the C block.

In accordance with one aspect of the present invention, a space or void is left after the B-64 sub-block and the 48-byte sub-block (i.e., before the C block), and the 16-byte sub-block 34 is inserted into that space before the data sequence is presented for deduplication. Similarly, the same 16-byte sub-block 34 is omitted from its displaced position after the C block before the data sequence is presented for deduplication. However, if the system receives a read request for the data sequence in question, the sequence is returned to the order as found in the HSM formatting (i.e., back-up data sequence 40) before being provided to the requesting entity (e.g., the client).

Results show the effectiveness of reordering as taught in this invention. In one experiment, a full dataset was backed up in two different ways (physical order, then logical order). Without the reordering, the logical order back-up was found to be 78.99% different from the physical order back-up. With the reordering, the logical order back-up was found to be 8.37% different from the physical order back-up. Then a change of 17% was applied to a subset of the files in the dataset. Without the reordering, the incremental back-up of the changed files was found to differ by 35.03% from data already stored. With the reordering, the incremental back-up of the changed files was found to differ by 19.94% from data already stored. Again, a change of 17% was applied to a subset of the files in the dataset. Without the reordering, the second incremental back-up of the changed files was found to differ by 24.18% from data already stored. With the reordering, the second incremental back-up of the changed files was found to differ by 18.51% from data already stored.

Figure 3:
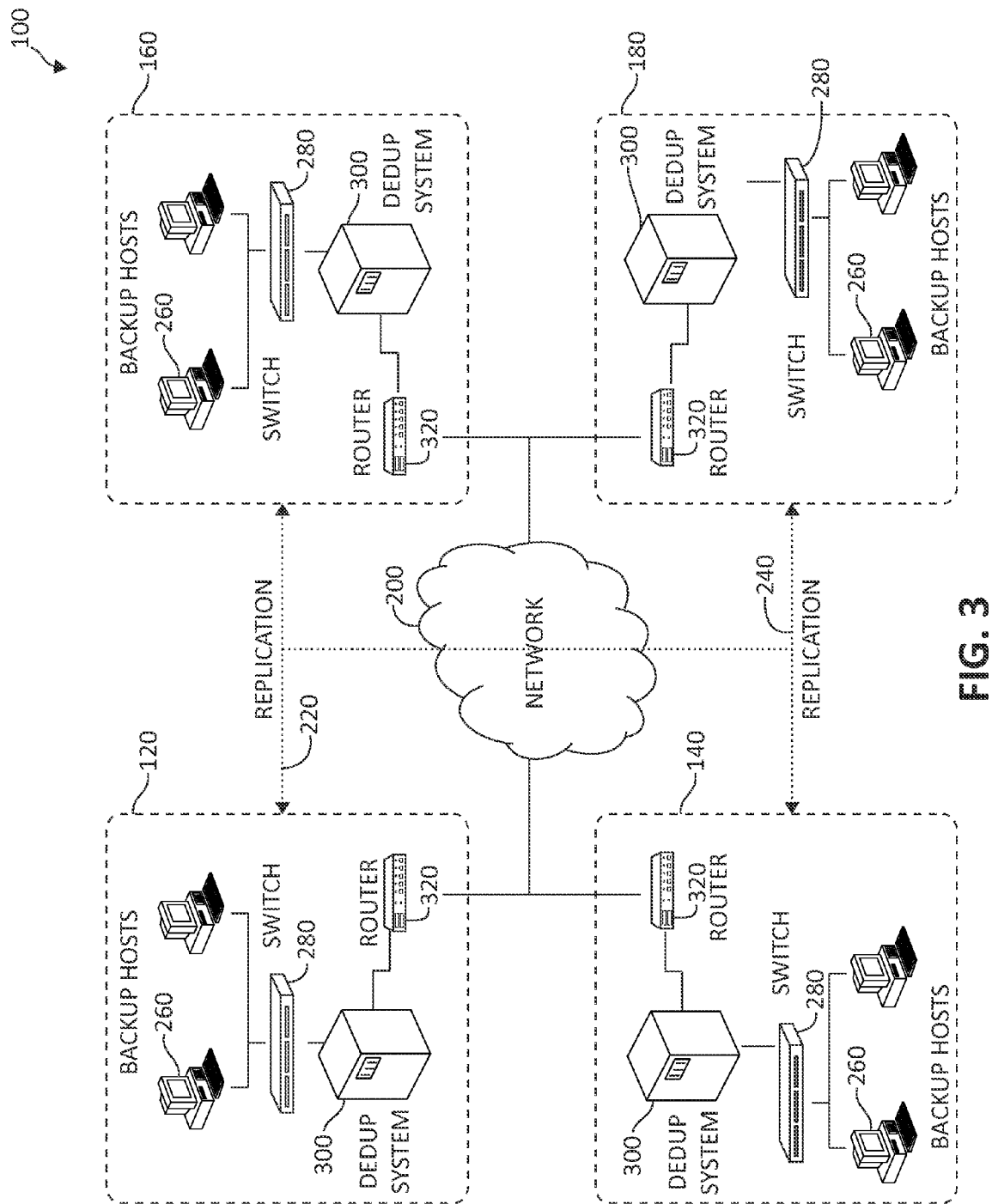
FIG. 3 illustrates an exemplary computing environment in which aspects of the present invention may be implemented.

FIG. 3 illustrates exemplary architecture 100 of deduplication systems and related components in a computing storage environment. The architecture 100 provides storage services to several back-up hosts 260. Deduplicated data replication is provided between various deduplication system groups 120, 140, 160, and 180 as indicated by dashed lines 220 and 240. Each of groups 120, 140, 160, and 180 includes one or more hosts 260, which are connected to a deduplication system 300 via networking components such as a switch 280 as indicated. Deduplication systems 300 are interconnected via networking components such as a router 320, which provides internetwork connectivity between groups 120, 140, 160, and 180. A network 200 connects such deduplication systems 300 and routers 320. The network 200 may, in one embodiment, include a wide area network (WAN). In other embodiments, the network 200 may include local area networks (LANs), storage area networks (SANs), and other network topologies known to the skilled artisan. While routers 320 and switches 280 are shown, the skilled artisan will also appreciate that additional and/or substitute networking components are contemplated.

In one embodiment, the switch 280 is compliant with a fibre channel network protocol, making the switch 280 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 100 provides one example of components that may be utilized to implement various facets of the present invention and claimed subject matter, the skilled artisan will appreciate that other such architectures are contemplated.

Figure 4:
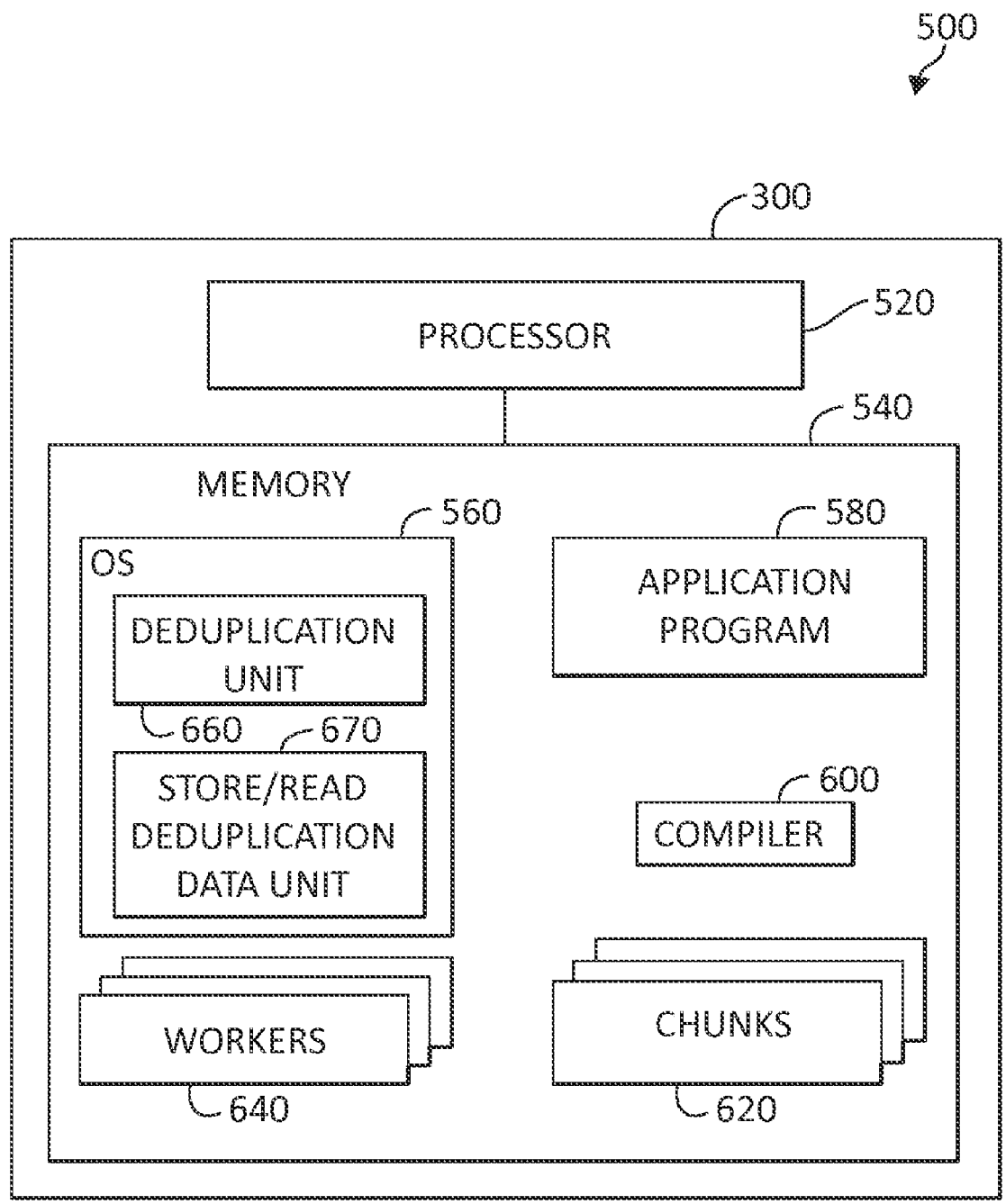
FIG. 4 illustrates an exemplary portion of a deduplication system as illustrated in FIG. 3, previously, including a processor device.

Turning now to FIG. 4, an exemplary portion 500 of a deduplication system 300 as also seen in FIG. 3, previously, is illustrated. The portion 500 of the deduplication system 300 is operable in a computer environment as a portion thereof, in which mechanisms of the above illustrated embodiments may be implemented. It should be appreciated, however, that FIG. 4 is only exemplary and is not intended to state or imply any limitation as to the particular architectures in which the exemplary aspects of the various embodiments may be implemented. Many modifications to the architecture depicted in FIG. 4 may be made without departing from the scope and spirit of the following description and claimed subject matter.

The deduplication system 300 includes a processor 520 and a memory 540, such as random access memory (RAM). The deduplication system 300 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 300.

In the illustrated embodiment, the deduplication system 300 operates under control of an operating system (OS) 560 (e.g. z/OS, OS/2, LINUX, UNIX, WINDOWS, MAC OS) stored in the memory 540, and interfaces with the user to accept inputs and commands and to present results. The OS 560 includes a deduplication unit 660 and a unit to store/read deduplicated data 670.

The deduplication system 300 may implement a compiler 600 that allows an application program 580 written in a programming language such as COBOL, PL/1, C, C++, JAVA, ADA, BASIC, VISUAL BASIC or any other programming language to be translated into code that is readable by the processor 520. After completion, the computer program 580 accesses and manipulates data stored in the memory 560 of the system 300 using the relationships and logic that was generated using the compiler 600.

To further implement and execute mechanisms and processes according to the present invention, the OS 560, in conjunction with the memory 540, the processor 520, the program 580, and other computer processing, networking, and storage components, may implement workers 640 in order to process chunks 620 of deduplicated data. The deduplicated documents processed by the deduplication system 300 may be stored in the memory 540 in a format consistent with the present invention. As the skilled artisan will appreciate, the mechanisms of the workers 640 and the chunks 620 as presently illustrated may be implemented in various forms and architectures. Accordingly, the illustration of the workers 640 and the chunks 620 in the present figure is again intended to demonstrate logical relationships between possible computing components in the deduplication system 300, and not to imply a specific physical structure or relationship.

In one embodiment, instructions implementing the operating system 560, the computer program 580, and the compiler 600, as well as the workers 640 and chunks 620 are tangibly embodied in a computer-readable medium, which may include one or more fixed or removable data storage devices, such as a zip drive, disk, hard drive, DVD/CD-ROM, digital tape, SSDs, etc. Further, the operating system 560 and the computer program 580 comprise instructions (e.g., in executable portions) which, when read and executed by the system 300, cause the system 300 to perform the steps necessary to implement and/or use the present invention. The computer program 580 and/or the operating system 560 instructions may also be tangibly embodied in the memory 560 and/or transmitted through or accessed by network 200 via various components (e.g., router 320, FIG. 6). As such, the terms "article of manufacture," "program storage device" and "computer program product" as may be used herein are intended to encompass a computer program accessible and/or operable from any computer readable device or media.

Embodiments of the present invention may include one or more associated software application programs 580 that include, for example, functions for managing a distributed computer system comprising a network of computing devices, such as a storage area network (SAN). Accordingly, the processor 520 may comprise one or more storage management processors (SMP). The program 580 may operate within a single computer and/or deduplication system 300 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any order unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A computer system comprising:
at least one computer-readable medium; and
at least one processor device in operable communication with the at least one computer-readable medium, the at least one processor being adapted to:
receive a sequence of data,
identify a header on the sequence of data indicating wherein the sequence of data is formatted for back-up such that an order of the sequence of data is different than the order of an input sequence of the data,
generate a copy of the sequence of data,
add a space into the copy of the sequence of data that has been formatted for back-up, form a new sequence of data from the copy of the sequence of data by inserting a first data block into the space so that the new sequence of data has a same order as the input sequence of the data, and
perform deduplication using the new sequence of data;
wherein the processor device is further adapted to, upon receiving a read request, provide an other copy of the sequence of the data, wherein the other copy of the sequence of the data is the sequence of data in the same order as the back-up sequence of the data, and wherein the back-up sequence of the data is formatted by a Hierarchical Storage Management (HSM) application.

2. The computer system of claim 1, wherein the input sequence of the data comprises the first data block and a second data block, wherein the second data block is positioned after the first data block in the input sequence of the data.

3. The computer system of claim 2, wherein in the back-up sequence of the data, the second data block is positioned before the first data block.

4. The computer system of claim 3, wherein the processor device is further adapted to:
generate the copy of the sequence of the data with the space positioned before the second data block; and
insert a copy of the first data block into the space.

5. The computer system of claim 1, wherein deduplicated data is formed as a result of performing deduplication using the new sequence of data, and the processor device is further adapted to store the deduplicated data.

6. A computer program product for deduplicating data in a computing environment, the computing environment comprising at least one non-transitory computer-readable medium having computer-readable program code portions stored thereon, the computer-readable program code portions comprising:
a first executable portion for receiving a sequence of data;
a second executable portion for identifying a header on the sequence of data indicating the sequence of data is formatted for back-up such that an order of the sequence of data is different than the order of an input sequence of the data;
a third executable portion for generating a copy of the sequence of data;
a fourth executable portion for adding a space into the copy of the sequence of the data that has been formatted for back-up;
a fifth executable portion for forming a new sequence of data from the copy of the sequence of data by inserting a first data block into the space so that the new sequence of data has a same order as the input sequence of the data: and a sixth executable portion for performing deduplication using the new sequence of data;

a seventh executable portion for, upon receiving a read request, providing an other copy of the sequence of the data, wherein the other copy of the sequence of the data is the sequence of data in the same order as the back-up sequence of the data, and wherein the back-up sequence of the data is formatted by a Hierarchical Storage Management (HSM) application.

7. The computer program product of claim 6, wherein the input sequence of the data comprises the first data block and a second data block, wherein the second data block is positioned after the first data block in the input sequence of the data.

8. The computer program product of claim 7, wherein in the back-up sequence of the data, the second data block is positioned before the first data block.

9. The computer program product of claim 8, further comprising:

a seventh executable portion for generating the copy of the sequence of the data with the space positioned before the second block of data; and a eighth executable portion for inserting a copy of the first block of data into the space.

10. The computer program product of claim 6, wherein deduplicated data is formed as a result of performing deduplication using the new sequence of data, and the computer program product further comprises a seventh executable portion for storing the deduplicated data.

* * * * *